US011720687B2

(12) United States Patent
Inagaki et al.

(10) Patent No.: US 11,720,687 B2
(45) Date of Patent: Aug. 8, 2023

(54) METHOD AND APPARATUS FOR MANAGEMENT OF VULNERABILITY DISCLOSURES

(71) Applicant: JPMorgan Chase Bank, N.A., New York, NY (US)

(72) Inventors: Bryan S. Inagaki, West Grove, PA (US); Christopher Sansone, New York, NY (US); Ainsley G. Rattray, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/988,966

(22) Filed: Nov. 17, 2022

(65) Prior Publication Data
US 2023/0072258 A1    Mar. 9, 2023

Related U.S. Application Data

(63) Continuation of application No. 16/535,509, filed on Aug. 8, 2019, now Pat. No. 11,531,762.
(Continued)

(51) Int. Cl.
G06F 3/048 (2013.01)
G06F 21/57 (2013.01)
(Continued)

(52) U.S. Cl.
CPC .......... G06F 21/577 (2013.01); G06F 3/0484 (2013.01); G06F 16/252 (2019.01); *G06F 2221/033* (2013.01); *G06Q 10/0635* (2013.01)

(58) Field of Classification Search
CPC .... G06F 21/577; G06F 3/0484; G06F 16/252; G06F 2221/033; G06Q 10/0635;
(Continued)

(56) References Cited

U.S. PATENT DOCUMENTS 7,890,869 B1    2/2011  Mayer et al.
8,966,639 B1    2/2015  Roytman et al.
(Continued)

FOREIGN PATENT DOCUMENTS

WO    2017/0019684    2/2017

OTHER PUBLICATIONS

Author unknown, "National Vulnerability Database" https://nvd.nist.gov/ (Year: 2022).
(Continued)

*Primary Examiner* — Steven B Theriault
(74) *Attorney, Agent, or Firm* — Greenblum & Bernstein, P.L.C.

(57) ABSTRACT

Various methods, apparatuses/systems, and media for managing vulnerability data are provided. A processor allows ingestion of vulnerability data from an external database into a local database which then makes the vulnerability data available for review via a graphical user interface (GUI). The processor also compares a risk score associated with each vulnerability included in the vulnerability data to a predefined threshold value; modifies, based on a determination that the risk score exceeds the predefined threshold value, the risk score by receiving user input via the GUI in accordance with risk information applicable to systems managed and operated by an organization; and updates a list of vulnerabilities of the vulnerability data stored in the local database by supplementing with the modified risk score without overwriting the risk score associated with each vulnerability initially received from the external database.

20 Claims, 6 Drawing Sheets

Related U.S. Application Data

(60) Provisional application No. 62/717,418, filed on Aug. 10, 2018.

(51) Int. Cl.
*G06F 16/25* (2019.01)
*G06F 3/0484* (2022.01)
*G06Q 10/0635* (2023.01)

(58) Field of Classification Search
CPC . H04L 63/1433; H04L 63/20; H04L 63/1416; H04L 63/14; H04L 63/0227
See application file for complete search history.

(56) References Cited

U.S. PATENT DOCUMENTS

| | | | |
|---|---|---|---|
| 8,984,643 | B1 | 3/2015 | Krisher et al. |
| 9,501,647 | B2 | 11/2016 | Yampolskiy et al. |
| 10,754,958 | B1 | 8/2020 | Sidagni |
| 2011/0191854 | A1 | 8/2011 | Giakouminakis et al. |
| 2014/0025442 | A1 | 1/2014 | Goodson et al. |
| 2014/0173737 | A1 | 6/2014 | Toback et al. |
| 2015/0237062 | A1 | 8/2015 | Roytman et al. |
| 2015/0237065 | A1 | 8/2015 | Roytman et al. |
| 2017/0085595 | A1 | 3/2017 | Ng et al. |
| 2017/0286690 | A1 | 10/2017 | Chari et al. |
| 2018/0121657 | A1* | 5/2018 | Hay ..................... G06F 21/51 |
| 2018/0167414 | A1 | 6/2018 | O'Reilly |
| 2018/0183827 | A1 | 6/2018 | Zorlular et al. |
| 2019/0102560 | A1 | 4/2019 | Zettel, II et al. |
| 2019/0147167 | A1 | 5/2019 | Kim et al. |
| 2020/0050770 | A1 | 2/2020 | Inagaki et al. |
| 2020/0106801 | A1 | 4/2020 | Evans |
| 2020/0382546 | A1 | 12/2020 | Henderson |
| 2022/0159030 | A1 | 5/2022 | Kang et al. |

OTHER PUBLICATIONS

Official communication (Search Report and Opinion) in W.I.P.O Patent Application No. PCT/US2019/045965, dated Oct. 24, 2019.

* cited by examiner

METHOD AND APPARATUS FOR MANAGEMENT OF VULNERABILITY DISCLOSURES

CROSS-REFERENCE TO RELATED APPLICATIONS

This application is a Continuation of U.S. application Ser. No. 16/535,509, filed Aug. 8, 2019, which claims the benefit of U.S. Provisional Patent Application No. 62/717,418, filed Aug. 10, 2018, which is hereby incorporated by reference in its entirety.

TECHNICAL FIELD

This disclosure generally relates to management of vulnerability disclosures, and, more particularly, to methods and apparatuses for implementing a vulnerability disclosures management device for processing vulnerability disclosures from a common source to associate detected vulnerabilities with applications at an organization and present those potential vulnerabilities to analysts for further review and research.

BACKGROUND

In today's technology rich business environment, both commercial and non-commercial organizations are increasingly becoming targets for cyber-attacks from hackers, viruses, and other malware. Because of the increasing reliance on connected technology, and the resulting exposure to cyber-attack risk, commercial and non-commercial organizations are increasingly required to monitor new threats either to satisfy regulatory requirements or to retain the trust of customers. Smaller organizations and individual consumers may generally utilize relatively unsophisticated virus and malware detection software to detect and mitigate threats. However, when the organization becomes large, there arises a need for more proactive approaches. Because of the fact that larger organizations may be more visible to attackers, frequently may have access to higher levels of assets, and generally may have large numbers of software applications and systems, such large organizations may be frequently subject to an increased risk of attack. As a result, it may be common for such organizations to implement threat monitoring and detection groups. These groups may be staffed with threat management analysts and proactively seek to identify vulnerabilities that could potentially be the target of cyber-attacks. Because this is a desire that is common among many different organizations and industries, there exist listings of vulnerabilities which can be utilized to identify and track the potential risks to an organization. An example of such a list is the Common Vulnerability Exposures (CVE) list. The open-source CVE list is maintained within the National Vulnerability Database (NVD). The CVE list, however, may not provide a platform or process for review of the listed vulnerabilities to determine if they impact a particular organization or the extent of impact that they might have on the organization.

SUMMARY

The present disclosure, through one or more of its various aspects, embodiments, and/or specific features or sub-components, provides, among others, various systems, servers, devices, methods, media, programs, and platforms for implementing a vulnerability disclosures management device including a vulnerability disclosures management module that may be configured for management of identified vulnerabilities that permits a threat management group to identify and track threats that may be particularly significant to its organization, thereby generating a list of prioritized remediation and interfacing with remediation resources so that remediation can be expedited and automatically implemented in an efficient manner.

According to an aspect of the present disclosure, a method for managing vulnerability data by utilizing one or more processors and one or more memories is disclosed. The method may include: establishing a link between an external database external to a vulnerability data management device managed and operated by an organization and a local database embedded within the vulnerability data management device via a communication network; receiving continuous feed of vulnerability data from the external database and storing the feed of vulnerability data onto the local database, the vulnerability data including a list of vulnerabilities and corresponding risks; filtering the received vulnerability data to exclude vulnerabilities that are not applicable to systems managed and operated by the organization and storing the filtered vulnerability data onto the local database; causing a graphical user interface (GUI) to display the filtered vulnerability data to a user; comparing a risk score associated with each vulnerability included in the filtered vulnerability data to a predefined threshold value; determining, based on comparing, whether the risk score exceeds the predefined threshold value; modifying, based on determining that the risk score exceeds the predefined threshold value, the risk score by receiving user input via the GUI in accordance with risk information applicable to the systems managed and operated by the organization; and updating the list of vulnerabilities of the filtered vulnerability data stored in the local database by supplementing with the modified risk score without overwriting the risk score associated with each vulnerability initially received from the external database.

According to another aspect of the present disclosure, the external database may be a national vulnerability database (NVD) that stores common vulnerabilities and exposures (CVEs) information, and the method may further include: receiving the continuous feed of vulnerability data from the NVD as extensible markup language (XML) feed.

According to yet another aspect of the present disclosure, the method may further include: receiving a new risk score associated with a vulnerability from the external database; determining whether the new risk score is at or below the predefined threshold value; and automatically updating, based on determining that the new risk score is at or below the predefined threshold value, the list of vulnerabilities of the filtered vulnerability data stored in the local database by supplementing with the new risk score without overwriting the risk score associated with each vulnerability initially received from the external database.

According to further aspect of the present disclosure, the method may further include: receiving a new risk score associated with a vulnerability from the external database; determining whether the new risk score exceeds the predefined threshold value; adding, based on determining that the new risk score exceeds the predefined threshold value, the vulnerability with which the new risk score is associated to an analysis workflow for further processing; modifying the new risk score by receiving user input via the GUI in accordance with risk information applicable to the systems managed and operated by the organization; and updating the list of vulnerabilities of the filtered vulnerability data stored in the local database by supplementing with the modified new risk score without overwriting the risk score associated with each vulnerability initially received from the external database.

According to yet another aspect of the present disclosure, the method may further include: creating a first queue in the local database for vulnerabilities with risk scores that have been received from the external database; creating a second queue for vulnerabilities with risk scores that have been modified by the user; and causing the GUI to display the first queue and the second queue in a manner such that a reviewer is not allowed to modify the second queue.

According to an additional another aspect of the present disclosure, the method may further include: modifying the risk score by changing a risk score to a weighted value in accordance with risk information applicable to the systems managed and operated by the organization.

According to yet another aspect of the present disclosure, the predefined threshold value may be 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization.

According to another aspect of the present disclosure, a system for managing vulnerability data is disclosed. The system may include a processor, an external database external to a vulnerability data management device managed and operated by an organization, a local database embedded within the vulnerability data management device, and a communication network. The processor may be configured to: establish a link between the external database and the local database via the communication network; receive continuous feed of vulnerability data from the external database and store the feed of vulnerability data onto the local database, the vulnerability data including a list of vulnerabilities and corresponding risks; filter the received vulnerability data to exclude vulnerabilities that are not applicable to systems managed and operated by the organization and store the filtered vulnerability data onto the local database; cause a graphical user interface (GUI) to display the filtered vulnerability data to a user; compare a risk score associated with each vulnerability included in the filtered vulnerability data to a predefined threshold value; determine, based on comparing, whether the risk score exceeds the predefined threshold value; modify, based on determining that the risk score exceeds the predefined threshold value, the risk score by receiving user input via the GUI in accordance with risk information applicable to the systems managed and operated by the organization; and update the list of vulnerabilities of the filtered vulnerability data stored in the local database by supplementing with the modified risk score without overwriting the risk score associated with each vulnerability initially received from the external database.

According to further aspect of the present disclosure, the processor may be further configured to: receive a new risk score associated with a vulnerability from the external database; determine whether the new risk score is at or below the predefined threshold value; and automatically update, based on determining that the new risk score is at or below the predefined threshold value, the list of vulnerabilities of the filtered vulnerability data stored in the local database by supplementing with the new risk score without overwriting the risk score associated with each vulnerability initially received from the external database.

According to yet another aspect of the present disclosure, the processor may be further configured to: receive a new risk score associated with a vulnerability from the external database; determine whether the new risk score exceeds the predefined threshold value; add, based on determining that the new risk score exceeds the predefined threshold value, the vulnerability with which the new risk score is associated to an analysis workflow for further processing; modify the new risk score by receiving user input via the GUI in accordance with risk information applicable to the systems managed and operated by the organization; and update the list of vulnerabilities of the filtered vulnerability data stored in the local database by supplementing with the modified new risk score without overwriting the risk score associated with each vulnerability initially received from the external database.

According to an additional aspect of the present disclosure, the processor may be further configured to: create a first queue in the local database for vulnerabilities with risk scores that have been received from the external database; create a second queue for vulnerabilities with risk scores that have been modified by the user; and cause the GUI to display the first queue and the second queue in a manner such that a reviewer is not allowed to modify the second queue.

According to yet another aspect of the present disclosure, the processor may be further configured to: modify the risk score by changing a risk score to a weighted value in accordance with risk information applicable to the systems managed and operated by the organization.

According to another aspect of the present disclosure, a non-transitory computer readable medium configured to store instructions for managing vulnerability data is disclosed. The instructions, when executed, may cause a processor to perform the following: establishing a link between an external database external to a vulnerability data management device managed and operated by an organization and a local database embedded within the vulnerability data management device via a communication network; receiving continuous feed of vulnerability data from the external database and storing the feed of vulnerability data onto the local database, the vulnerability data including a list of vulnerabilities and corresponding risks; filtering the received vulnerability data to exclude vulnerabilities that are not applicable to systems managed and operated by the organization and storing the filtered vulnerability data onto the local database; causing a graphical user interface (GUI) to display the filtered vulnerability data to a user; comparing a risk score associated with each vulnerability included in the filtered vulnerability data to a predefined threshold value; determining, based on comparing, whether the risk score exceeds the predefined threshold value; modifying, based on determining that the risk score exceeds the predefined threshold value, the risk score by receiving user input via the GUI in accordance with risk information applicable to the systems managed and operated by the organization; and updating the list of vulnerabilities of the filtered vulnerability data stored in the local database by supplementing with the modified risk score without overwriting the risk score associated with each vulnerability initially received from the external database.

According to yet another aspect of the present disclosure, the instructions, when executed, may further cause the processor to perform the following: receiving a new risk score associated with a vulnerability from the external database; determining whether the new risk score is at or below the predefined threshold value; and automatically updating, based on determining that the new risk score is at or below the predefined threshold value, the list of vulnerabilities of the filtered vulnerability data stored in the local database by supplementing with the new risk score without overwriting the risk score associated with each vulnerability initially received from the external database.

According to an additional aspect of the present disclosure, the instructions, when executed, may further cause the processor to perform the following: receiving a new risk score associated with a vulnerability from the external database; determining whether the new risk score exceeds the predefined threshold value; adding, based on determining that the new risk score exceeds the predefined threshold value, the vulnerability with which the new risk score is associated to an analysis workflow for further processing; modifying the new risk score by receiving user input via the GUI in accordance with risk information applicable to the systems managed and operated by the organization; and updating the list of vulnerabilities of the filtered vulnerability data stored in the local database by supplementing with the modified new risk score without overwriting the risk score associated with each vulnerability initially received from the external database.

According to still another aspect of the present disclosure, the instructions, when executed, may further cause the processor to perform the following: creating a first queue in the local database for vulnerabilities with risk scores that have been received from the external database; creating a second queue for vulnerabilities with risk scores that have been modified by the user; and causing the GUI to display the first queue and the second queue in a manner such that a reviewer is not allowed to modify the second queue.

According to yet another aspect of the present disclosure, the instructions, when executed, may further cause the processor to perform the following: modifying the risk score by changing a risk score to a weighted value in accordance with risk information applicable to the systems managed and operated by the organization.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
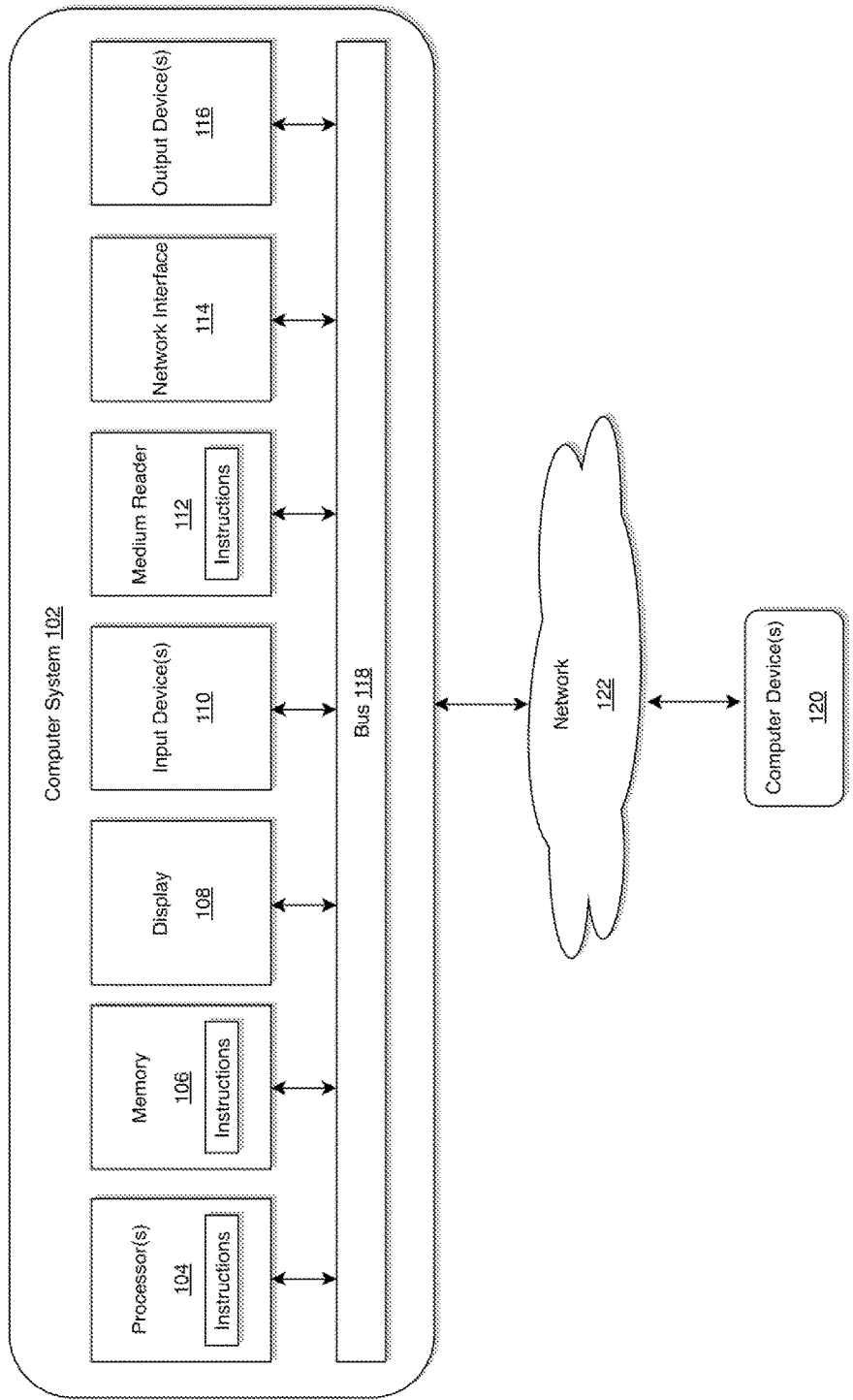
FIG. 1 illustrates a computer system for implementing a vulnerability disclosures management device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a vulnerability disclosures management device including a vulnerability disclosures management module that may be configured for management of identified vulnerabilities that may permit a threat management group to identify and track threats that may be particularly significant to its organization, thereby generating a list of prioritized remediation and interfacing with remediation resources so that remediation can be expedited and automatically implemented in an efficient manner.

Figure 2:
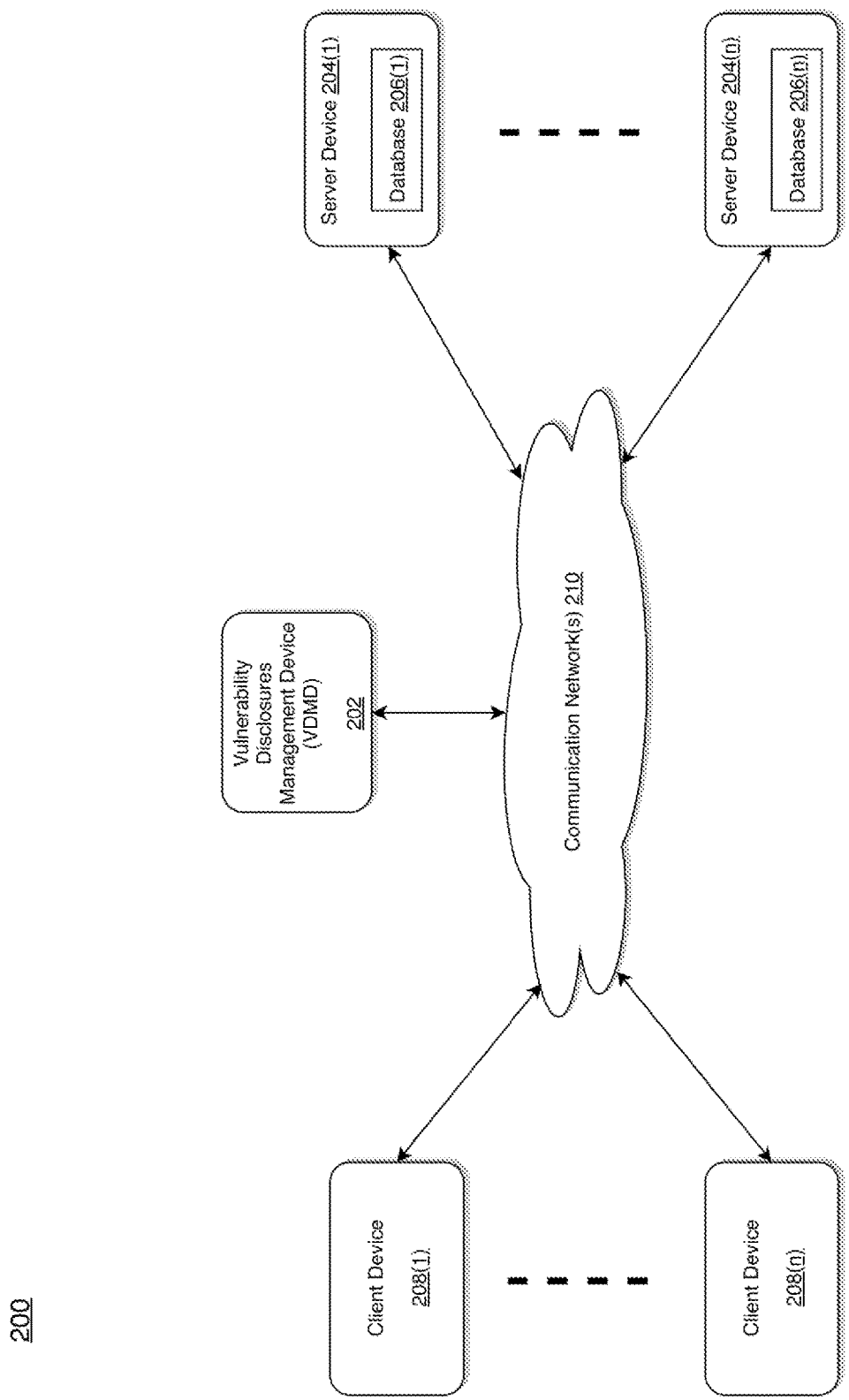
FIG. 2 illustrates an exemplary diagram of a network environment with a vulnerability disclosures management device in accordance with an exemplary embodiment.

Referring to FIG. 2, a schematic of an exemplary network environment 200 for implementing a vulnerability disclosures management device having vulnerability disclosures management module (VDMM) of the instant disclosure is illustrated.

Conventional system, that does not implement a VDMM of the instant disclosure, may not be able to identify and track threats that may be particularly significant to its organization. For example, the Common Vulnerability Exposures (CVE) list is an open source that is maintained within the National Vulnerability Database (NVD). The CVE list, however, may not provide a platform or process for review of the listed vulnerabilities to determine if they impact a particular organization or the extent of impact that they might have on the organization. Thus, the conventional system, that does not implement a VDMM of the instant disclosure, may not be able to identify and track threats that may be particularly significant to its organization.

According to exemplary embodiments, the above-described problems associated with conventional system may be overcome by implementing a vulnerability disclosures management device (VDMD) 202 having vulnerability disclosures management module as illustrated in FIG. 2. The VDMD 202 may be the same or similar to the computer system 102 as described with respect to FIG. 1.

The VDMD 202 may store one or more applications that can include executable instructions that, when executed by the VDMD 202, cause the VDMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VDMD 202 itself, may be located in virtual server(s) running in a cloud-based computing environment rather than being tied to one or more specific physical network computing devices. Also, the application(s) may be running in one or more virtual machines (VMs) executing on the VDMD 202. Additionally, in one or more embodiments of this technology, virtual machine(s) running on the VDMD 202 may be managed or supervised by a hypervisor.

In the network environment 200 of FIG. 2, the VDMD 202 is coupled to a plurality of server devices 204(1)-204(n) that hosts a plurality of databases 206(1)-206(n), and also to a plurality of client devices 208(1)-208(n) via communication network(s) 210. A communication interface of the VDMD 202, such as the network interface 114 of the computer system 102 of FIG. 1, operatively couples and communicates between the VDMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VDMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs). Ethernet-based Packet Data Networks (PDNs), combinations thereof, and the like.

The VDMD 202 may be a standalone device or integrated with one or more other devices or apparatuses, such as one or more of the server devices 204(1)-204(n), for example. In one particular example, the VDMD 202 may be hosted by one of the server devices 204(1)-204(n), and other arrangements are also possible. Moreover, one or more of the devices of the VDMD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VDMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the VDMD 202 that may be configured for management of identified vulnerabilities that permits a threat management group to identify and track threats that may be particularly significant to its organization, thereby efficiently generating a list of prioritized remediation and interfacing with remediation resources so that remediation can be expedited and automatically implemented. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the VDMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the VDMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VDMD 202, the server devices 204(1)-204(n), or the client devices 208(1)-208(n), for example, may be configured to operate as virtual instances on the same physical machine. For example, one or more of the VDMD 202, the server devices 204(1)-204(n), or the client devices 208(1)-208(n) may operate on the same physical device rather than as separate devices communicating through communication network(s) 210. Additionally, there may be more or fewer VDMDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
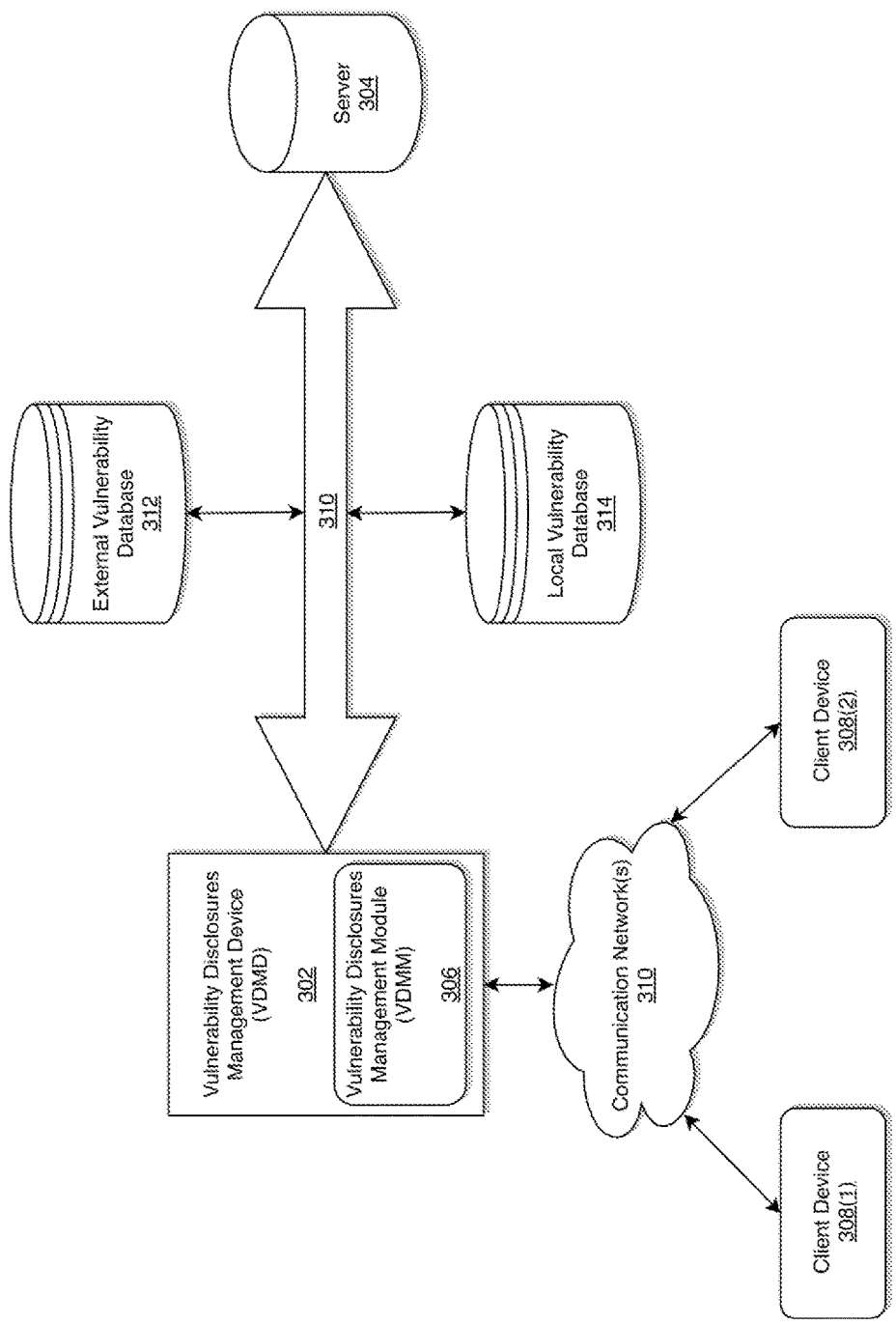
FIG. 3 illustrates a system diagram for implementing a vulnerability disclosures management device with a vulnerability disclosures management module in accordance with an exemplary embodiment.

FIG. 3 illustrates a system diagram for implementing a vulnerability disclosures management device (VDMD) with a vulnerability disclosures management module (VDMM) in accordance with an exemplary embodiment.

As illustrated in FIG. 3, the VDMD 302 including the VDMM 306 may be connected to a server 304, an external vulnerability database 312, and a local vulnerability database 314 via a communication network 310. The VDMD 302 may also be connected to a first client device 308(1) and a second client device 308(2) via the communication network 310, but the disclosure is not limited thereto.

According to exemplary embodiment, the VDMD 302 is described and shown in FIG. 3 as including the VDMM 306, although it may include other rules, policies, modules, databases, or applications, for example. According to exemplary embodiments, the local vulnerability database 314 may be embedded within the VDMD 302. According to exemplary embodiments, the external vulnerability database 312 may be a national vulnerability database (NVD) that stores common vulnerabilities and exposures (CVEs) information, and the VDMM 306 may be configured to receive continuous feed of vulnerability data from the NVD as extensible markup language (XML) feed and store the continuous feed of vulnerability data onto the local vulnerability database 314.

As will be described below, the VDMM 306 may be configured to automatically receive, on a daily basis, a listing of vulnerability exposures from a feed of vulnerabilities (e.g., an XML feed) from the external vulnerability database 312 and stored in a local vulnerability database 314. According to exemplary embodiments, the stored listing of vulnerabilities may be updated when new information is ingested from a feed of vulnerabilities from the external vulnerability database 312. In an exemplary embodiment, changes to the local vulnerability database 314 resulting from new or updated vulnerability data received from the external vulnerability database 312 may be logged. In addition to ingesting current vulnerabilities, exemplary embodiments may also ingest historical vulnerability data from the XML feed and other sources (not shown).

According to exemplary embodiments, a list of vulnerability exposures may include threat information and a user (e.g., a vulnerability threat analyst) may have the ability to edit items from the list of vulnerabilities stored in the local vulnerability database 314 to supplement or modify those items. These edited items may not be overwritten, modified, or destroyed by vulnerability exposure data later ingested into the local vulnerability database 314 from the external vulnerability database 312.

The first client device 308(1) and the second client device 308(2) are illustrated as being in communication with the VDMD 302. In this regard, the first client device 308(1) and the second client device 308(2) may be "clients" of the VDMD 302 and are described herein as such. Nevertheless, it is to be known and understood that the first client device 308(1) and/or the second client device 308(2) need not necessarily be "clients" of the VDMD 302, or any entity described in association therewith herein. Any additional or alternative relationship may exist between either or both of the first client device 308(1) and the second client device 308(2) and the VDMD 302, or no relationship may exist.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(2) may communicate with the VDMD 302 via broadband or cellular communication. Of course, these embodiments are merely exemplary and are not limiting or exhaustive.

Figure 4:
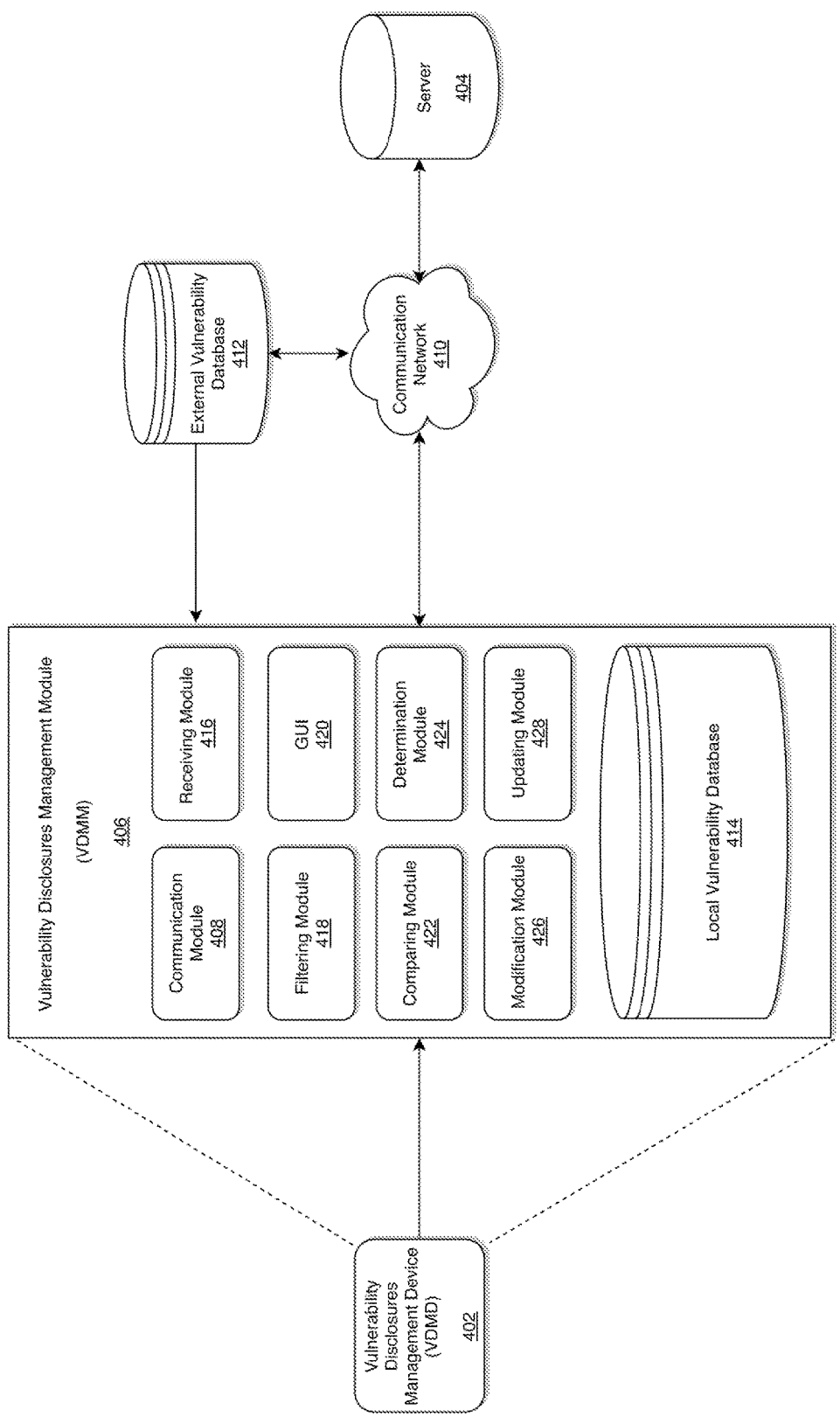
FIG. 4 illustrates a system diagram for implementing a vulnerability disclosures management module of FIG. 3 in accordance with an exemplary embodiment.

FIG. 4 illustrates a system diagram for implementing a vulnerability disclosures management module of FIG. 3 in accordance with an exemplary embodiment. As illustrated in FIG. 4, the system 400 may include a VDMD 402 within which a VDMM 406 may be embedded, an external vulnerability database 412, a server 404, and a communication network 410.

As illustrated in FIG. 4, the VDMM 406 may include a communication module 408, a receiving module 416, a filtering module 418, a graphical user interface (GUI) 420, a comparing module 422, a determination module 424, a modification module 426, an updating module 428, and a local vulnerability database 414. According to exemplary embodiments, the external vulnerability database 412 may be external to the VDMD 402 and the VDMD 402 may include various systems that are managed and operated by an organization.

The process may be executed via the communication network 410, which may comprise plural networks as described above. For example, in an exemplary embodiment, the various components of the VDMM 406 may communicate with the server 404, the external vulnerability database 412, and the local vulnerability database 414 via the communication module 408 and the communication network 410. Of course, these embodiments are merely exemplary and are not limiting or exhaustive.

According to exemplary embodiments, the communication module 408 may be configured to establish a link between the external vulnerability database 412 and the local vulnerability database 414 via the communication network 410.

According to exemplary embodiments, the receiving module 416 may be configured to receive continuous feed of vulnerability data from the external vulnerability database 412 on a daily basis and the VDMM 406 may be configured to store the feed of vulnerability data onto the local vulnerability database 414. According to exemplary embodiments, the vulnerability data may include a list of vulnerabilities and corresponding risks, but the disclosure is not limited thereto.

According to exemplary embodiments, the filtering module 418 may be configured to filter the received vulnerability data to exclude vulnerabilities that are not applicable to systems managed and operated by the organization and store the filtered vulnerability data onto the local vulnerability database 414.

Based on receiving and storing the filtered vulnerability data, a processor embedded within the VDMM 406 may cause a graphical user interface (GUI) 420 to display the filtered vulnerability data to a user. In an exemplary embodiment, a listing of vulnerability exposures (i.e., vulnerability data including threat information) may be ingested on a daily basis from the external vulnerability database 412 as XML feed. An example of external vulnerability database 412 is the National Vulnerability Database (NVD).

According to exemplary embodiments, the comparing module 422 may be configured to compare a risk score associated with each vulnerability included in the filtered vulnerability data to a predefined threshold value. According to exemplary embodiments, the predefined threshold value may be 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization. However, the disclosure is not limited thereto. For example, the predefined threshold value may be any value between 8.0 and 10.0.

According to exemplary embodiments, the determination module 424 may be configured to determine, based on comparing, whether the risk score exceeds the predefined threshold value.

According to exemplary embodiments, the modification module 426 may be configured to modify, based on determining that the risk score exceeds the predefined threshold value, the risk score by receiving user input via the GUI 420 in accordance with risk information applicable to the systems managed and operated by the organization.

According to exemplary embodiments, the updating module 428 may be configured to update the list of vulnerabilities of the filtered vulnerability data stored in the local vulnerability database 414 by supplementing with the modified risk score without overwriting the risk score associated with each vulnerability initially received from the external vulnerability database 412.

According to exemplary embodiments, the receiving module 416 may be further be configured to receive a new risk score associated with a vulnerability from the external vulnerability database 412, the determination module 424 may be configured to determine whether the new risk score is at or below the predefined threshold value, and the updating module 428 may be configured to automatically update, based on determining that the new risk score is at or below the predefined threshold value, the list of vulnerabilities of the filtered vulnerability data stored in the local vulnerability database 414 by supplementing with the new risk score without overwriting the risk score associated with each vulnerability initially received from the external vulnerability database 412.

According to exemplary embodiments, the receiving module 416 may be further configured to receive a new risk score associated with a vulnerability from the external vulnerability database 412, the determination module 424 may be configured to determine whether the new risk score exceeds the predefined threshold value, the VDMM 406 may be configured to add, based on determining that the new risk score exceeds the predefined threshold value, the vulnerability with which the new risk score is associated to an analysis workflow for further processing. Based receiving workflow, the modification module 426 may be configured to modify the new risk score by receiving user input via the GUI 420 in accordance with risk information applicable to the systems managed and operated by the organization, and the updating module 428 may be configured to update the list of vulnerabilities of the filtered vulnerability data stored in the local vulnerability database 414 by supplementing with the modified new risk score without overwriting the risk score associated with each vulnerability initially received from the external vulnerability database 412.

According to exemplary embodiments, the modification module 426 may be configured to the risk score by changing a risk score to a weighted value in accordance with risk information applicable to the systems managed and operated by the organization.

According to exemplary embodiments, the updating module 428 may be further configured to: create a first queue in the local vulnerability database 414 for vulnerabilities with risk scores that have been received from the external vulnerability database 412; create a second queue for vulnerabilities with risk scores that have been modified by the user; and cause the GUI 420 to display the first queue and the second queue in a manner such that a reviewer is not allowed to modify the second queue.

Figure 4A:
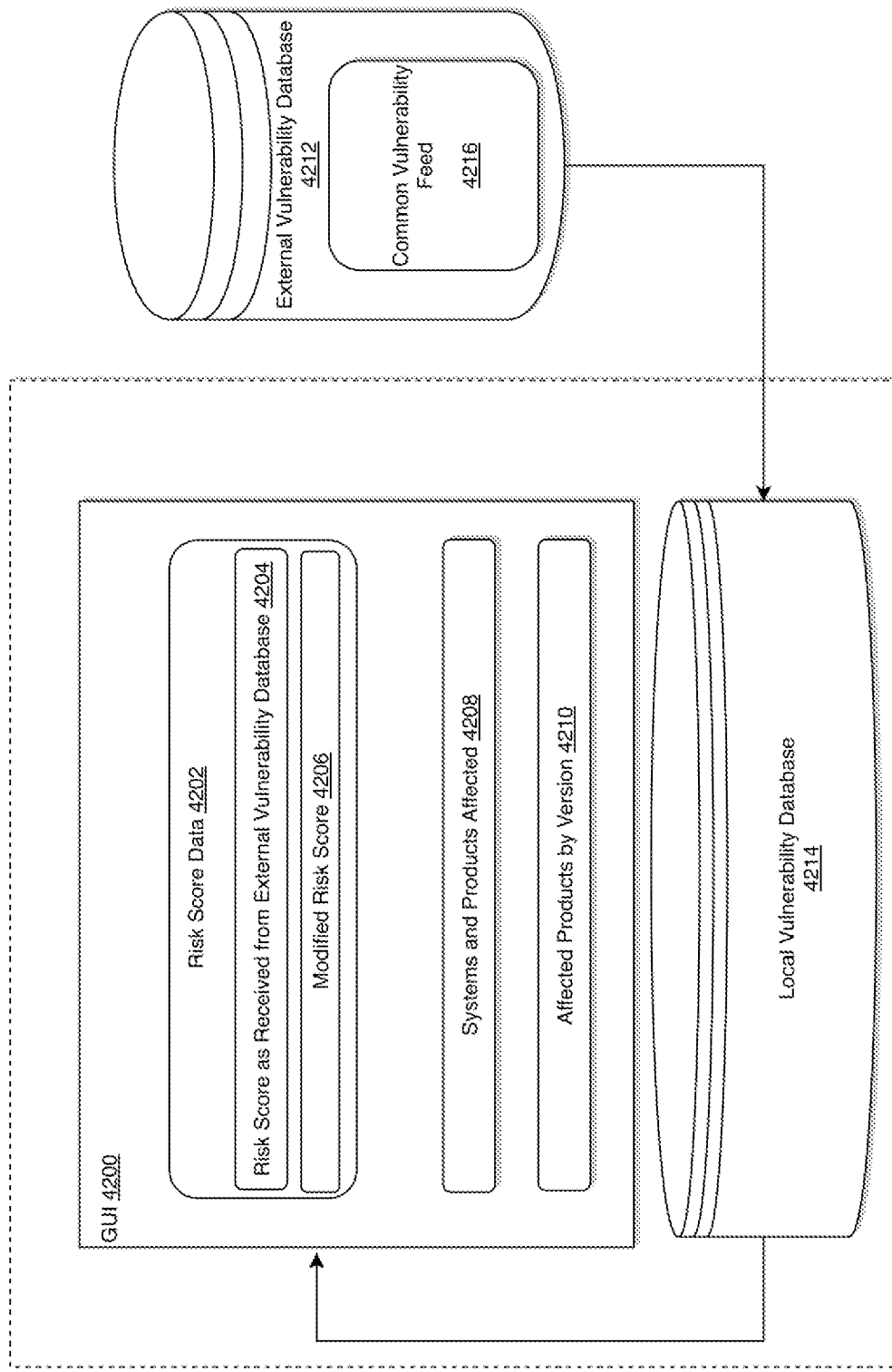
FIG. 4A illustrates a graphical user interface of FIG. 4 in accordance with an exemplary embodiment.

FIG. 4A illustrates a graphical user interface of FIG. 4 that is in communication with an external vulnerability database and a local vulnerability database in accordance with an exemplary embodiment.

As illustrated in FIG. 4A, a listing of vulnerability exposures (i.e., vulnerability data having threat information) may be ingested on a daily basis from the external vulnerability database 4212 of vulnerabilities, e.g., common vulnerability feed 4216 and stored in the local vulnerability database 4214. The external vulnerability database 4212 is external to an organization. An example of the external vulnerability database 4212 is the National Vulnerability Database (NVD). The external vulnerability database 4212 makes the common vulnerability feed 4216 available for download. This feed may be delivered via XML or other protocols and methods. The common vulnerability feed 4216 may be provided to the local vulnerability database 4214 which provides processing and reporting at the organizational level. An example of such reporting is a GUI 4200.

In some exemplary embodiments, a vulnerability feed may be received from internal sources such as other portions of the organization. Thus, such an embodiment has inputs from both external sources and also sources internal to the organization. In certain exemplary embodiments, the external vulnerabilities may be received from various sources of threat monitoring and reporting including commercial threat tracking and mitigation concerns.

In some exemplary embodiments, reporting may also be performed at various levels within the organization. For instance, a line of business may be used to refer to a portion of the organization that is directed to a portion of the activities of the overall organization. In some exemplary embodiments, a vulnerability feed may be provided to a line of business where the vulnerability feed is limited to notifications that are related only to those vulnerabilities that are applicable to the software and hardware environment maintained by the line of business. Typically, the stored listing of vulnerabilities may be updated when new information is ingested from the common vulnerability feed 4216. As would be understood by one of ordinary skill in the art, the external vulnerability database 4212 and thus, the common vulnerability feed 4216, may comprise threats to a wide variety of systems. Because an organization may not necessarily employ all such systems, the local vulnerability database 4214 may be configured to process the received common vulnerability feed in order to exclude those threats that are not applicable to an organization by utilizing a filtering module (i.e., the filtering module 418 as illustrated in FIG. 4).

In some exemplary embodiments, a data feed may include a uniform resource locator (URL) that "points" toward a patch intended to remediate a vulnerability. In such embodiments, the deployment of the patch may be automated.

In some exemplary embodiments, changes to the local vulnerability database 4214 as a result of new or updated vulnerability data may be logged so as to create a history of changes to a particular record or group of records. For example, if the common vulnerability feed 4216 indicates that a threat has increased in severity, the change in threat level (or score) may be recorded such that an analyst or other user can understand that a threat is increasing in severity and take such actions as are deemed necessary. In an exemplary embodiment, the threat level score ranges from 0 to 10 and functions to allow analysts and other users to prioritize a response or the proactive measures taken to address a particular vulnerability. An example of such a threat score may be the Common Vulnerability Scoring System (CVSS) promulgated by the National Infrastructure Advisory Counsel. This scoring system takes into account such information as how an attacker may exploit a vulnerability, the difficulty involved in such an exploitation, the level of authentication required for an attacker to conduct the attack, the impact on the confidentiality of system data, impacts to the integrity of the exploited system, and the potential impact on the availability of the exploited system.

As illustrated in FIG. 4A, the exemplary GUI 4200 displays risk score data 4202 that includes risk score 4204 as received from the external vulnerability database 4212 as will as a modified risk score 4206 without overwriting the risk score 4204. The exemplary GUI 4200 also displays affected systems and products 4208 managed and operated by the organization and affected products by version 4210 so that the organization can take appropriate action as to how to mitigate the vulnerability.

Figure 5:
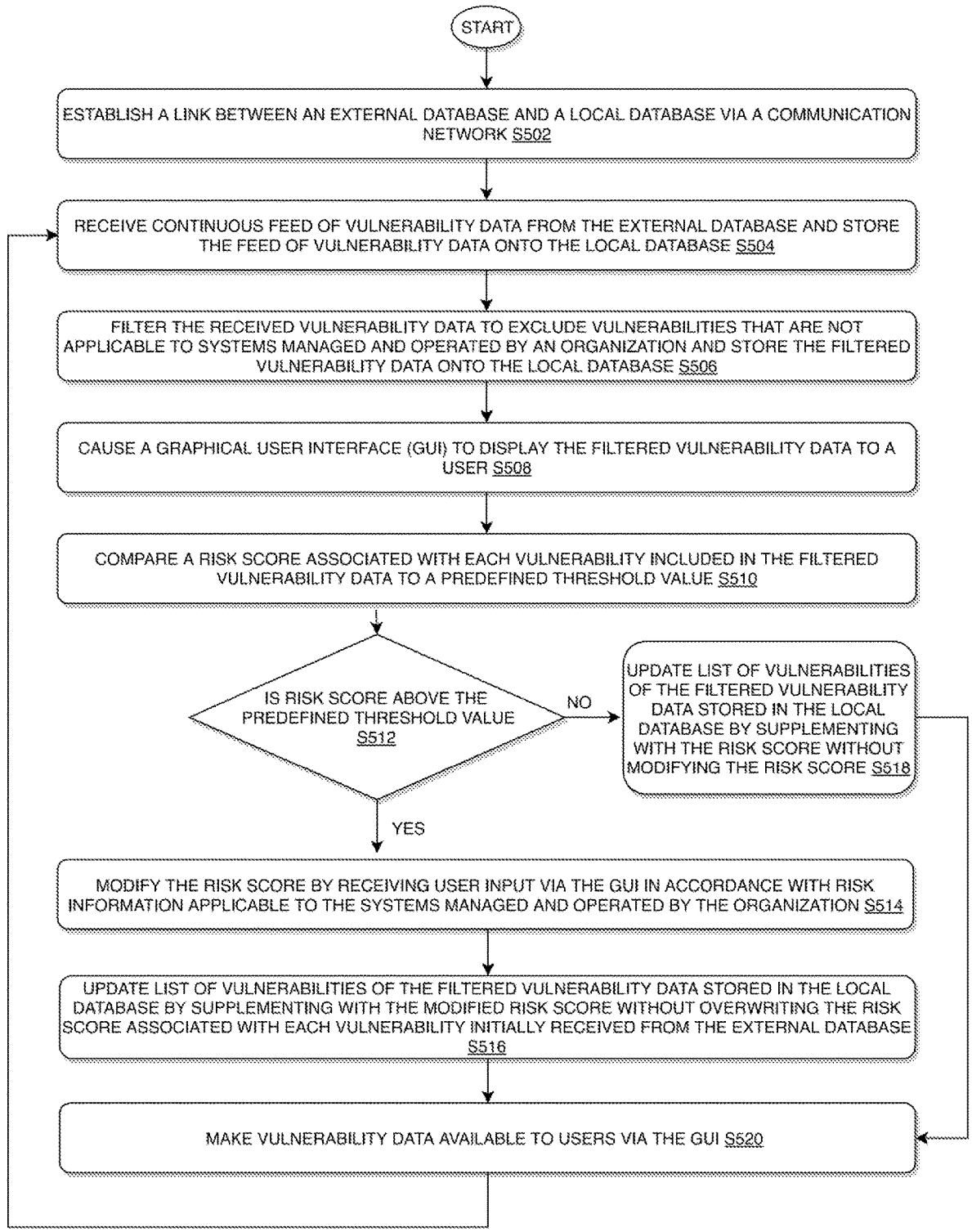
FIG. 5 illustrates a flow chart for implementing a vulnerability disclosures management device in accordance with an exemplary embodiment.

FIG. 5 illustrates a flow chart for implementing a vulnerability disclosures management device in accordance with an exemplary embodiment.

In the process 500 of FIG. 5, at step S502, a communication link may be established between an external database external to a vulnerability data management device managed and operated by an organization and a local database embedded within the vulnerability data management device via a communication network. According to exemplary embodiments, the external database may be the same or similar to the external vulnerability database as illustrated herein with respect to FIGS. 3, 4, and 4A, the vulnerability data management device may be the same as or similar to the VDMD as illustrated herein with respect to FIGS. 3, 4, and 4A, and the local database may be the same or similar to the local vulnerability database as illustrated herein with respect to FIGS. 3, 4, and 4A, and the network may be the same or similar to the communication network 410 as illustrated herein with respect to FIGS. 3, 4, and 4A, but the disclosure is not limited thereto.

At step S504, continuous feed of vulnerability data from the external database and may be received and the feed of vulnerability data may be stored onto the local database. According to exemplary embodiments, the vulnerability data may include a list of vulnerabilities and corresponding risks, but the disclosure is not limited thereto.

At step S506, the received vulnerability data may be filtered to exclude vulnerabilities that are not applicable to systems managed and operated by the organization and the filtered vulnerability data may be stored onto the local database.

At step S508, the process 500 may cause a graphical user interface (GUI) to display the filtered vulnerability data to a user.

At step S510, a risk score associated with each vulnerability included in the filtered vulnerability data may be compared to a predefined threshold value. According to exemplary embodiments, the predefined threshold value may be 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization.

At step S512 a determination may be made whether the risk score is above the predefined threshold value.

When it is determined that the risk score is above the predefined threshold value, at step S514, the risk score may be modified by receiving user input via the GUI in accordance with risk information applicable to the systems managed and operated by the organization.

At step S516, the list of vulnerabilities of the filtered vulnerability data stored in the local database may be updated by supplementing with the modified risk score without overwriting the risk score associated with each vulnerability initially received from the external database.

When it is determined that the risk score is at or below the predefined threshold value, at step S518, the list of vulnerabilities of the filtered vulnerability data stored in the local database may be updated by supplementing with the risk score as it is received from the external database without overwriting the risk score associated with each vulnerability initially received from the external database.

At step S520, the vulnerability data may be made available for review and further processing to users via the GUI and the process 500 may continue again from step S504.

According to exemplary embodiments, the process 500 may further include: receiving a new risk score associated with a vulnerability from the external database; determining whether the new risk score is at or below the predefined threshold value; and automatically updating, based on determining that the new risk score is at or below the predefined threshold value, the list of vulnerabilities of the filtered vulnerability data stored in the local database by supplementing with the new risk score without overwriting the risk score associated with each vulnerability initially received from the external database.

According to exemplary embodiments, the process 500 may further include: receiving a new risk score associated with a vulnerability from the external database; determining whether the new risk score exceeds the predefined threshold value; adding, based on determining that the new risk score exceeds the predefined threshold value, the vulnerability with which the new risk score is associated to an analysis workflow for further processing; modifying the new risk score by receiving user input via the GUI in accordance with risk information applicable to the systems managed and operated by the organization; and updating the list of vulnerabilities of the filtered vulnerability data stored in the local database by supplementing with the modified new risk score without overwriting the risk score associated with each vulnerability initially received from the external database.

According to exemplary embodiments, the process 500 may further include: creating a first queue in the local database for vulnerabilities with risk scores that have been received from the external database; creating a second queue for vulnerabilities with risk scores that have been modified by the user; and causing the GUI to display the first queue and the second queue in a manner such that a reviewer is not allowed to modify the second queue.

According to exemplary embodiments, the process 500 may further include: modifying the risk score by changing a risk score to a weighted value in accordance with risk information applicable to the systems managed and operated by the organization.

According to exemplary embodiments as disclosed above in FIGS. 1-5, technical improvements effected by the instant disclosure may include platforms for implementing a vulnerability disclosures management device including a vulnerability disclosures management module that may be configured for management of identified vulnerabilities that permits a threat management group to identify and track threats that may be particularly significant to its organization, thereby efficiently generating a list of prioritized remediation and interfacing with remediation resources so that remediation can be expedited and automatically implemented.

For example, according to exemplary embodiments as disclosed above in FIGS. 1-5, a listing of vulnerability exposures may be ingested on a daily basis from a feed of vulnerabilities (e.g., an XML feed) and stored in a database. The stored listing of vulnerabilities may be updated when new information is ingested from a feed of vulnerabilities. In an exemplary embodiment, changes to the database resulting from new or updated vulnerability data may be logged. In addition to ingesting current vulnerabilities, exemplary embodiments also ingest historical vulnerability data from the XML feed and other sources.

According to exemplary embodiments as disclosed above in FIGS. 1-5, a user may have the ability to edit items from the list of vulnerabilities stored in the database to supplement or modify those items. These edited items may not be overwritten, modified, or destroyed by vulnerability exposure data later ingested into the local database.

According to exemplary embodiments as disclosed above in FIGS. 1-5, a user may have the ability to search vulnerability information. Some exemplary embodiments provide a graphical user interface (GUI) such that vulnerability information may be presented to a user, for example, information regarding the severity of the risk and systems that are susceptible to the detected vulnerability.

According to exemplary embodiments as disclosed above in FIGS. 1-5, a workflow for threat management analyst review is configured to facilitate manual review of vulnerabilities above a configurable threshold. In some exemplary embodiments, vulnerabilities that are found in the workflow for threat management analyst review may be maintained in a queue for manual processing. In other exemplary embodiments, the vulnerabilities may be automatically processed. In still other exemplary embodiments, the vulnerabilities may be organized according to characteristics of the vulnerability and processed automatically in some cases of low vulnerability, little or no external exposure, and a low incidence of actual exploitation detected externally to the organization. Processing may be performed manually in cases of higher vulnerability, higher levels of external exposure, and higher instances of exploitation detected externally to the organization. Thus, the characteristics of a vulnerability may be taken into account by exemplary embodiments when determining how to respond to the vulnerability.

In some exemplary embodiments, a vulnerability score originally assigned to a vulnerability may be modified by an analyst to reflect information specific to an organization. Certain embodiments may have a score modification workflow that permits the generation of an overall score and vulnerability vector string that is stored within a local database record associated with the vulnerability. The score may be maintained in the local database such that the modified scores do not overwrite the initial score. In such exemplary embodiments, a secondary queue is maintained for vulnerabilities when scores have been modified. This permits peer review of score modifications and may be configured such that the original reviewer is not permitted to modify the secondary queue.

In some exemplary embodiments, metrics data is calculated which may include total vulnerabilities, vulnerability breakdown by date, vulnerability breakdown by product/vendor, a record of analyst modified vulnerabilities, vulnerabilities by severity, and vulnerability scores over time.

Certain exemplary embodiments may provide an application program interface (API) that may present data files necessary for vulnerability scoring according to various models, including the VxSx scoring model.

In some exemplary embodiments, additional user data fields may be created so that vulnerability management analysts may provide additional details regarding the vulnerability such as mitigations in place or detailed remediation steps.

In some exemplary embodiments, access methods are configured such that vulnerability data access may be limited based upon the role of the accessor.

In some exemplary embodiments, information regarding remediation or mitigation of a vulnerability may be used to predict from historical data how long a new vulnerability with similar characteristics to a previously mitigated vulnerability would take to mitigate or remediate. Information on past remediation or mitigations may be sourced automatically from existing systems or a manual feed may be provided by an analyst. A system configured to perform these predictions may assist with resource scheduling, resource alerting, or resource availability by utilizing the VDMM disclosed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing vulnerability data by utilizing one or more processors and one or more memories, the method comprising:
   establishing a link between an external database external to a vulnerability data management device managed and operated by an organization and a local database embedded within the vulnerability data management device via a communication network;
   receiving continuous feed of vulnerability data from an external database and storing the feed of vulnerability data onto a local database, the vulnerability data including a list of vulnerabilities and corresponding risks;
   filtering the received vulnerability data to exclude vulnerabilities that are not applicable to systems managed and operated by the organization and storing the filtered vulnerability data onto the local database;
   causing a graphical user interface (GUI) to display the filtered vulnerability data to a user;
   comparing a risk score associated with each vulnerability included in the filtered vulnerability data to a predefined threshold value;
   determining, based on comparing, whether the risk score exceeds the predefined threshold value;
   modifying, based on determining that the risk score exceeds the predefined threshold value, the risk score by receiving user input via the GUI in accordance with risk information applicable to the systems managed and operated by the organization;
   updating the list of vulnerabilities of the filtered vulnerability data stored in the local database by supplementing with the modified risk score without overwriting the risk score associated with each vulnerability initially received from the external database;
   creating a first queue in the local database for vulnerabilities with risk scores that have been received from the external database;
   creating a second queue for vulnerabilities with risk scores that have been modified by the user; and
   causing the GUI to display the first queue and the second queue in a manner such that a reviewer is not allowed to modify the second queue.

2. The method according to claim 1, wherein the external database is a national vulnerability database (NVD) that stores common vulnerabilities and exposures (CVEs) information, and the method further comprising:
   receiving the continuous feed of vulnerability data from the NVD as extensible markup language (XML) feed.

3. The method according to claim 1, further comprising:
   receiving a new risk score associated with a vulnerability from the external database;
   determining whether a new risk score is at or below the predefined threshold value; and
   automatically updating, based on determining that the new risk score is at or below the predefined threshold value, the list of vulnerabilities of the filtered vulnerability data stored in the local database by supplementing with the new risk score without overwriting the risk score associated with each vulnerability initially received from the external database.

4. The method according to claim 1, further comprising:
   receiving a new risk score associated with a vulnerability from the external database;
   determining whether the new risk score exceeds the predefined threshold value;
   adding, based on determining that the new risk score exceeds the predefined threshold value, the vulnerability with which the new risk score is associated to an analysis workflow for further processing;
   modifying the new risk score by receiving user input via the GUI in accordance with risk information applicable to the systems managed and operated by the organization; and
   updating the list of vulnerabilities of the filtered vulnerability data stored in the local database by supplementing with the modified new risk score without overwriting the risk score associated with each vulnerability initially received from the external database.

5. The method according to claim 1, wherein the external database is external to a vulnerability data management device managed and operated by an organization and the local database is embedded within the vulnerability data management device.

6. The method according to claim 1, wherein modifying the risk score includes changing a risk score to a weighted value in accordance with risk information applicable to the systems managed and operated by the organization.

7. The method according to claim 1, wherein the predefined threshold value is 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization.

8. A system for managing vulnerability data, comprising:
a processor;
an external database external to a vulnerability data management device managed and operated by an organization;
a local database embedded within the vulnerability data management device; and
a communication network,
wherein the processor is configured to:
establish a link between the external database and the local database via the communication network;
receive continuous feed of vulnerability data from the external database and store the feed of vulnerability data onto the local database, the vulnerability data including a list of vulnerabilities and corresponding risks;
filter the received vulnerability data to exclude vulnerabilities that are not applicable to systems managed and operated by the organization and store the filtered vulnerability data onto the local database;
cause a graphical user interface (GUI) to display the filtered vulnerability data to a user;
compare a risk score associated with each vulnerability included in the filtered vulnerability data to a predefined threshold value;
determine, based on comparing, whether the risk score exceeds the predefined threshold value;
modify, based on determining that the risk score exceeds the predefined threshold value, the risk score by receiving user input via the GUI in accordance with risk information applicable to the systems managed and operated by the organization;
update the list of vulnerabilities of the filtered vulnerability data stored in the local database by supplementing with the modified risk score without overwriting the risk score associated with each vulnerability initially received from the external database;
create a first queue in the local database for vulnerabilities with risk scores that have been received from the external database;
create a second queue for vulnerabilities with risk scores that have been modified by the user; and
cause the GUI to display the first queue and the second queue in a manner such that a reviewer is not allowed to modify the second queue.

9. The system according to claim 8, wherein the external database is a national vulnerability database (NVD) that stores common vulnerabilities and exposures (CVEs) information, and the processor is further configured to:
receive the continuous feed of vulnerability data from the NVD as extensible markup language (XML) feed.

10. The system according to claim 8, wherein the processor is further configured to:
receive a new risk score associated with a vulnerability from the external database;
determine whether the new risk score is at or below the predefined threshold value; and
automatically update, based on determining that the new risk score is at or below the predefined threshold value, the list of vulnerabilities of the filtered vulnerability data stored in the local database by supplementing with the new risk score without overwriting the risk score associated with each vulnerability initially received from the external database.

11. The system according to claim 8, wherein the processor is further configured to:
receive a new risk score associated with a vulnerability from the external database;
determine whether the new risk score exceeds the predefined threshold value;
add, based on determining that the new risk score exceeds the predefined threshold value, the vulnerability with which the new risk score is associated to an analysis workflow for further processing;
modify the new risk score by receiving user input via the GUI in accordance with risk information applicable to the systems managed and operated by the organization; and
update the list of vulnerabilities of the filtered vulnerability data stored in the local database by supplementing with the modified new risk score without overwriting the risk score associated with each vulnerability initially received from the external database.

12. The system according to claim 8, wherein the external database is external to a vulnerability data management device managed and operated by an organization and the local database is embedded within the vulnerability data management device.

13. The system according to claim 8, wherein the processor is further configured to: modify the risk score by changing a risk score to a weighted value in accordance with risk information applicable to the systems managed and operated by the organization.

14. The system according to claim 8, wherein the predefined threshold value is 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization.

15. A non-transitory computer readable medium configured to store instructions for managing vulnerability data, wherein when executed, the instructions cause a processor to perform the following:
establishing a link between an external database external to a vulnerability data management device managed and operated by an organization and a local database embedded within the vulnerability data management device via a communication network;
receiving continuous feed of vulnerability data from the external database and storing the feed of vulnerability data onto the local database, the vulnerability data including a list of vulnerabilities and corresponding risks;
filtering the received vulnerability data to exclude vulnerabilities that are not applicable to systems managed and operated by the organization and storing the filtered vulnerability data onto the local database;

causing a graphical user interface (GUI) to display the filtered vulnerability data to a user;

comparing a risk score associated with each vulnerability included in the filtered vulnerability data to a predefined threshold value;

determining, based on comparing, whether the risk score exceeds the predefined threshold value;

modifying, based on determining that the risk score exceeds the predefined threshold value, the risk score by receiving user input via the GUI in accordance with risk information applicable to the systems managed and operated by the organization;

updating the list of vulnerabilities of the filtered vulnerability data stored in the local database by supplementing with the modified risk score without overwriting the risk score associated with each vulnerability initially received from the external database;

creating a first queue in the local database for vulnerabilities with risk scores that have been received from the external database;

creating a second queue for vulnerabilities with risk scores that have been modified by the user; and causing the GUI to display the first queue and the second queue in a manner such that a reviewer is not allowed to modify the second queue.

16. The non-transitory computer readable medium according to claim 15, wherein when executed, the instructions further cause the processor to perform the following:

receiving a new risk score associated with a vulnerability from the external database;

determining whether the new risk score is at or below the predefined threshold value; and automatically updating, based on determining that the new risk score is at or below the predefined threshold value, the list of vulnerabilities of the filtered vulnerability data stored in the local database by supplementing with the new risk score without overwriting the risk score associated with each vulnerability initially received from the external database.

17. The non-transitory computer readable medium according to claim 15, wherein when executed, the instructions further cause the processor to perform the following:

receiving a new risk score associated with a vulnerability from the external database;

determining whether the new risk score exceeds the predefined threshold value;

adding, based on determining that the new risk score exceeds the predefined threshold value, the vulnerability with which the new risk score is associated to an analysis workflow for further processing;

modifying the new risk score by receiving user input via the GUI in accordance with risk information applicable to the systems managed and operated by the organization; and updating the list of vulnerabilities of the filtered vulnerability data stored in the local database by supplementing with the modified new risk score without overwriting the risk score associated with each vulnerability initially received from the external database.

18. The non-transitory computer readable medium according to claim 15, wherein the external database is external to a vulnerability data management device managed and operated by an organization and the local database is embedded within the vulnerability data management device.

19. The non-transitory computer readable medium according to claim 15, wherein modifying the risk score includes changing a risk score to a weighted value in accordance with risk information applicable to the systems managed and operated by the organization.

20. The non-transitory computer readable medium according to claim 15, wherein the predefined threshold value is 8.5 in a severity scale of values ranging from 0 to 10, where "0" indicates the lowest severity impact of a vulnerability to a particular system managed and operated by the organization and "10 indicates the highest severity impact of a vulnerability to a particular system managed and operated by the organization.

* * * * *